United States Patent Office 2,771,376
Patented Nov. 20, 1956

2,771,376

LINING OF REFRACTORY VESSELS

John J. Capellman, Tarentum, Pa., assignor to Pittsburgh Plate Glass Company, Allegheny County, Pa., a corporation of Pennsylvania No Drawing. Application May 8, 1952,
Serial No. 286,805

6 Claims. (Cl. 106—57)

This invention relates to the lining of refractory tanks and more particularly to a novel lining material adapted to be applied to the bottom of a tank made up of fire clay or other refractory blocks to improve the corrosion resistance of the tank with respect to substances such as molten glass.

Tanks to be used for holding molten glass are ordinarily formed of refractory clay blocks which are fitted together as tightly as possible. In service the molten glass has a tendency to penetrate the joints between the blocks particularly at the bottom of the tank, and corrode the surfaces of the blocks, thereby making replacement of the blocks necessary. If blocks of a denser more resistant material are used extensive spalling occurs, and fragments of the blocks liberated by spalling float into the molten glass, thereby destroying the value of the glass charge contained in the tank.

It is accordingly an object of the present invention to provide a lining material for a refractory tank that has improved corrosion resistance with respect to molten glass. It is another object of the invention to provide a method of lining such a tank. It is still another object of the invention to provide a corrosion resistant tank lining material that is composed of relatively inexpensive substances and will protect the refractory material of the tank for a relatively long period of time. Other objects of the invention will be in part obvious and in part pointed out hereafter.

In accordance with the present invention a refractory lining is provided which contains zirconium silicate as its principal ingredient. It has been found that a lining composed essentially of zirconium silicate when properly applied to interior surfaces of a refractory tank or the like provides exceptionally good corrosion resistance over a relatively long period of time. While the zirconium silicate lining composition of the persent invention may be compounded in any of a variety of ways, the perferred method of preparing the composition may be generally described as follows. The zirconium silicate is desirably used in granular or finely-divided form and preferably has a particle size of the order of 100 to 200 mesh. In order to provide a composition having the necessary cohesiveness the zirconium silicate in mixed with a suitable binder to the extent of say 1 to 10% by weight of the mixture. It is possible to use organic binders such as gum arabic or resins, but preferred results with respect to molten glass have been obtained when using an inorganic binder such as sodium silicate. To facilitate application of the composition to refractory surfaces the zirconium silicate and sodium silicate are mixed with a sufficient quantity of water to form a plastic mass or thick paste. Ordinarily the water content of the mixture will be from 5 to 30% by weight thereof.

The zirconium silicate lining composition as thus prepared can be applied to the surfaces of the bottom blocks of a refractory tank in any suitable way such as by spreading with a trowel or the like, or by tamping. A layer of from ¼" to 1" in thickness has been found to provide a satisfactory lining. No firing of the lining is necessary since when the lining is wetted with molten glass it forms a dense refractory cover over the bottom blocks of the tank which is resistant to corrosion for relatively long periods of time. It is evident that after the water associated with the paste has been evaporated by contact with molten glass the resulting lining will contain 90 to 99% by weight of zirconium silicate and 1 to 10% by weight of sodium silicate.

In order to point out more fully the nature of the present invention, the following illustrative example is given of a preferred lining material and the method of preparing and applying the same: A mixture was prepared from the following ingredients:

25 lbs. zirconium silicate having a particle size of 100–200 mesh
10 lbs. zirconium silicate having a particle size less than 200 mesh
3 lbs. sodium silicate (Na$_2$SiO$_3$)
2 lbs. water The above ingredients were thoroughly mixed to produce a product having a dry press consistency. The mixture was applied to the upper surface of the bottom blocks of a small refractory tank and spread over the tank bottom by tamping to form a layer approximately ½" thick. Thereafter, molten glass was introduced into the tank and the lining was maintained in continuous contact with molten glass for a period of 18 weeks. At the end of this period the molten glass was removed and the bottom of the tank inspected. It was found that the bottom blocks were badly cracked, but there was no evidence of glass penetration through the lining into the blocks. The lining remained intact and there was no cracking or separation of the lining from the blocks.

From the foregoing description it is apparent that the present invention provides relatively inexpensive and exceptionally resistant lining material for application to surfaces of refractory vessels that are to be exposed to such materials as molten glass and the like. It is of course to be understood that the description is illustrative and that numerous changes can be made in the specific materials, proportions and conditions set forth without departing from the spirit of the invention as set forth in the appended claims.

I claim:

1. A lining paste for lining glass tank bottom refractory blocks which consists of water and a mixture of zirconium silicate and sodium silicate, said zirconium silicate having a maximum particle size of about 100 mesh and constituting 90 to 99% by weight of the mixture of zirconium silicate and sodium silicate, said paste having a dry press consistency.

2. The paste of claim 1 wherein the water constitutes 5 to 30% by weight of the paste.

3. The paste of claim 2 wherein the zirconium silicate content of the paste consists of 10 parts by weight of zirconium silicate having a particle size of less than 200 mesh to 25 parts by weight of zirconium silicate having a particle size of 100 to 200 mesh.

4. A method of lining the refractory blocks of the bottom of a glass tank furnace which comprises applying to the upper surfaces of said blocks to form a continuous lining a paste consisting of water and a mixture of zirconium silicate and sodium silicate, said zirconium silicate having a maximum particle size of about 100 mesh and constituting 90 to 99% by weight of the mixture of zirconium silicate and sodium silicate, and then introducing molten glass into contact with said paste lining.

5. The method of claim 4 wherein the water constitutes 5 to 30% by weight of the paste.

6. A glass tank formed of a refractory material and having a bottom portion of its interior surface covered by a lining consisting of a mixing of zirconium silicate and sodium silicate, said zirconium silicate having a maximum particle size of about 100 mesh and constituting 90 to 99% by weight of the mixture of zirconium silicate and sodium silicate.

References Cited in the file of this patent

UNITED STATES PATENTS

| | | |
|---|---|---|
| 1,816,006 | Easter | July 28, 1931 |
| 1,952,120 | Comstock | Mar. 27, 1934 |
| 2,567,088 | Teasel | Sept. 4, 1951 |

FOREIGN PATENTS

| | | |
|---|---|---|
| 569,282 | Great Britain | 1945 |